(12) United States Patent
Kohnen

(10) Patent No.: US 8,050,401 B2
(45) Date of Patent: Nov. 1, 2011

(54) HIGH SPEED CONFIGURABLE CRYPTOGRAPHIC ARCHITECTURE

(75) Inventor: Kirk K. Kohnen, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 1427 days.

(21) Appl. No.: 11/235,842

(22) Filed: Sep. 27, 2005

(65) Prior Publication Data

US 2007/0071236 A1 Mar. 29, 2007

(51) Int. Cl.
*H04L 9/14* (2006.01)
(52) U.S. Cl. ......................................................... 380/28
(58) Field of Classification Search .................... 380/28, 380/29, 42, 37
See application file for complete search history.

(56) References Cited

U.S. PATENT DOCUMENTS

| | | | | |
|---|---|---|---|---|
| 7,106,860 | B1 * | 9/2006 | Yu et al. | 380/37 |
| 2003/0039355 | A1 * | 2/2003 | McCanny et al. | 380/37 |
| 2004/0047466 | A1 * | 3/2004 | Feldman et al. | 380/37 |
| 2004/0184602 | A1 * | 9/2004 | Nadehara | 380/28 |
| 2005/0271204 | A1 * | 12/2005 | Chu | 380/44 |
| 2006/0023875 | A1 * | 2/2006 | Graunke | 380/28 |

\* cited by examiner

*Primary Examiner* — Ellen Tran
(74) *Attorney, Agent, or Firm* — Yee & Associates, P.C.

(57) ABSTRACT

Method and system to encrypt and decrypt data is provided. The method comprising, providing input data to be encrypted, said input data made up of a plurality of sub-data, each said sub-data comprising sequence of bits of data; dynamically selecting a plurality of invertible encryption parameters; and performing one or more rounds of a combination of data modification, sequence modification and data-sequence modification using plurality of selected encryption parameters deriving encrypted data. The system includes a processor for executing code for dynamically selecting a plurality of invertible encryption parameters.

18 Claims, 7 Drawing Sheets

HIGH SPEED CONFIGURABLE CRYPTOGRAPHIC ARCHITECTURE

CROSS REFERENCE TO RELATED APPLICATIONS

None

BACKGROUND OF THE INVENTION

1. Field of Invention

The present invention relates to computer implemented data encryption system, and more particularly, to a high-speed configurable data encryption system that provides flexibility while maintaining high data security.

2. Background

Increasingly, more and more electronic data are exchanged over computer networks (for example, the Internet). There is a need to secure data (both financial and personal) exchanged via computer networks by individuals and institutions. Various encryption and decryption methods are used to secure data. Some of the widely used data encryption algorithms that are currently in use are the DES, Triple-DES and AES.

One of the first data encryption algorithms are based on the data encryption standard (DES) adopted by the National Bureau of Standards (NBS). The DES uses a 56-bit "cipher key" for carrying out block encryption. According to the DES, each block of plain text has a length of 64 bits; and its cipher text (encrypted text) block also has the same bit length.

DES employs a small number of bits in its cipher key to encrypt 64-bit data blocks. Hence, DES fails to provide an effective data encryption scheme with a high security. Further, the cipher key is not uniformly assigned to all of the 64-bit blocks, and hence, it is relatively easy to decrypt a cipher text block (that is encrypted by a cipher key).

To answer the shortcomings of the DES technology, Triple DES was employed. Triple DES is based on the DES algorithm but uses a longer cipher key and runs the encryption routine 3 times. Three keys are involved—K1, K2, K3, which maybe unique or each one is related to one another or both. The general steps involved in Triple DES are encryption round with K1, decryption round with K2 and encryption round with K3. However, with the advancement in technology Triple DES is becoming simple enough to decrypt without knowing its key and therefore obsolete.

The Advanced Encryption Standard (AES) (incorporated herein by reference in its entirety) published by the National Institute of Standards and Technology (NIST) is now becoming a popular encryption algorithm. More information on AES is available from the website at csrc.nist.gov/CryptoToolkit/aes/.

AES offers a larger key size, a 128-bit key (the default), a 192-bit key, or a 256-bit key. The number of rounds performed during the execution of the algorithm depends on the key size. For example, the number of rounds for 128 bit key is 10, for 192 bit key it is 12, for 256 bit key it is 14.

AES begins the encryption cycle by first converting the plain text or input data to be encrypted into a State array. An initial Round Key addition is performed on the State array. Then, a pre-set number of regular encryption rounds (depending on the key size) are performed on the State array. Finally, a short encryption round is performed on the State array resulting in the encrypted text. A regular round of encryption includes the steps of Byte Substitution, Shift Row, Mix Column and Add Round Key. A short encryption round includes the Byte Substitution step, Shift Row step and Add Round Key step.

Even though AES provides better security than DES and Triple DES, it still has limitations. For example, AES specifies and uses identical parameters for its various rounds of encryption. This may make it susceptible to compromise especially with the development of future technology.

Therefore, there is a need for a method and system for a more flexible and potentially stronger encryption technique than AES.

SUMMARY OF THE INVENTION

In one aspect of the present invention, a method to encrypt and decrypt data is provided. The method comprising, providing input data to be encrypted, said input data made up of a plurality of sub-data, each said sub-data comprising sequence of bits of data; dynamically selecting a plurality of invertible encryption parameters; and performing one or more rounds of a combination of data modification, sequence modification and data-sequence modification using plurality of selected encryption parameters deriving encrypted data.

In another aspect of the present invention, a system to encrypt and decrypt data is provided. The system includes, a processor for executing code for dynamically selecting a plurality of invertible encryption parameters; and performing one or more rounds of a combination of data modification, sequence modification and data-sequence modification using plurality of selected encryption parameters deriving encrypted data.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. The illustrated embodiment is intended to illustrate, but not to limit the invention. The drawings include the following figures.

DETAILED DESCRIPTION OF THE PREFERRED EMBODIMENTS

Figure 1:
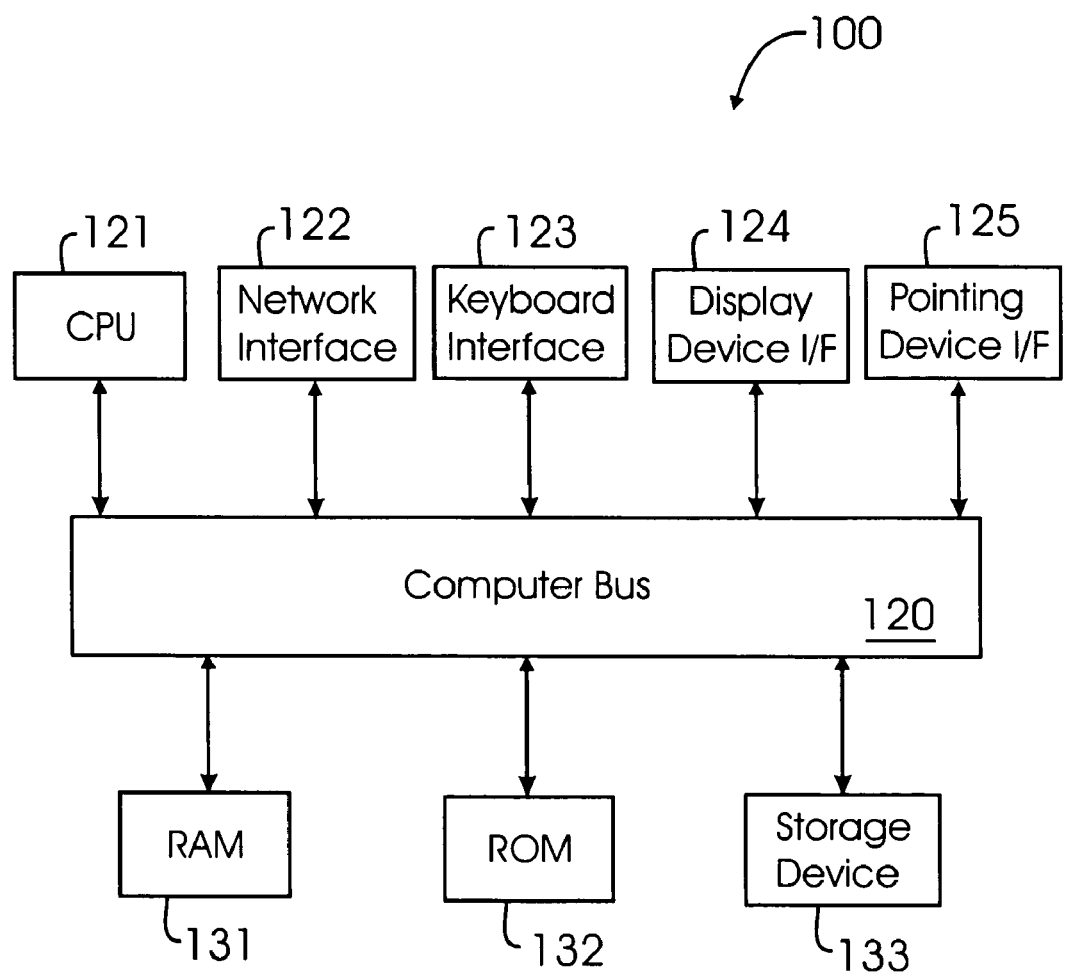
FIG. 1 shows a block diagram of a computing system for executing process steps, according to one aspect of the present invention.

The following definitions are provided as they are typically (but not exclusively) used in the data security environment, implementing the various adaptive aspects of the present invention:

Array: An enumerated collection of entities (e.g., an array of bytes).

Affine Transformation: A transformation consisting of multiplication by a polynomial followed by the addition of a constant.

Block: Sequence of binary bits, typically grouped together in bytes that comprise the input, output, State and Round Key. The length of a sequence is the number of bits it contains. Blocks are also interpreted as arrays of bytes.

Cipher: Series of transformations that converts plain text to cipher text using a Cipher Key.

Cipher Key: A secret, cryptographic key that is used by a Key Expansion routine to generate a set of Round Keys. This can be pictured as a rectangle array of bytes, having four rows by number of key (Nk) word columns.

Cipher text: Encrypted data output from the cipher or input to the Inverse cipher.

Encryption: A process of transforming clear text (data in its original form) into cipher text (encryption output of a cryptographic algorithm) for security or privacy.

Galois Field: This is a finite field containing $p^n$ elements

Key Expansion: Routine used to generate a series of Round Keys from the Cipher Key.

Plain text: Data input to the Cipher or output from the Inverse Cipher.

Round Key: Round keys are values derived from the Cipher Key using the Key expansion routine; they are applied to a State in the Cipher and Inverse Cipher.

S-box: Non-linear substitution table used in several byte-substitution transformations and in the Key expansion routine to perform a one-for-one substitution of a byte value.

State or State matrix: Intermediate cipher results that can be pictured as a rectangular array of bytes, having four rows and $N_b$ columns.

Word: A group of 32 bits that is treated either as a single entity or as an array of 4 bytes.

In one aspect, the present invention provides a system and process for implementing robust encryption-decryption algorithm to encrypt data. The invention allows one to dynamically choose from a plurality of encryption parameters and use the chosen encryption parameters to run encryption round(s).

A system and process is provided that receives the input data and uses various invertible encryption parameters to generate an encrypted data using one or more mathematical operations. The process selects one or more of the invertible encryption parameters that are presented during various stages of encryption and using the selected encryption parameters perform encryption of the input data.

In another aspect of the present invention, the process involves one or more regular encryption rounds and one short encryption round. A Regular encryption round involves four steps—Byte Substitution, Shift Row, Mix Column and Add Round Key as described below. A short encryption round involves steps—Byte Substitution, Shift Row and Add Round Key, also described below in detail. The present invention allows one to choose from a plurality of encryption parameters in each step in each round of encryption and using the chosen encryption parameters from the various steps in various rounds the input data is encrypted.

It is noteworthy that the adaptive aspects of the present invention are not limited to the embodiment(s) that are described herein; other techniques for converting the input data into encrypted data may be used.

Computing System:

To facilitate an understanding of the preferred embodiment, the general architecture and operation of a computing system will be described first. The specific process under the preferred embodiment will then be described with reference to the general architecture.

FIG. 1 is a block diagram showing the internal functional architecture of a computing system 100 that may be used to execute the computer-executable process steps, according to one aspect of the present invention. As shown in FIG. 1, computing system 100 includes a central processing unit (CPU) 121 for executing computer-executable process steps and interfaces with a computer bus 120. In one aspect, a Pentium® class or other similar processor may be used.

Also shown in FIG. 1 are a display device interface 124 that operatively connects display device such as monitors to system 100; a keyboard interface 123 that operatively connects input/output devices such as keyboards to system 100; a pointing device interface 125 that operatively connects pointing device such as a mouse to system 100, and a storage device 133. Storage device 133 may be disks, tapes, drums, integrated circuits, or the like, operative to hold data by any means, including magnetically, electrically, optically, and the like. Storage device 133 stores operating system program files, application program files, computer-executable process steps, web-browsers and other files. Some of these files are stored on storage device 133 using an installation program. For example, CPU 121 executes computer-executable process steps of an installation program so that CPU 121 can properly execute the application program.

Random access memory ("RAM") 131 also interfaces to computer bus 120 to provide CPU 121 with access to memory storage. When executing stored computer-executable process steps from storage device 133, CPU 121 stores and executes the process steps out of RAM 131.

Read only memory ("ROM") 132 is provided to store invariant instruction sequences such as start-up instruction sequences or basic input/output operating system (BIOS) sequences.

The computing system 100 can be connected to other computing systems through the network interface 122. Network interface 122 connects computing system 100 with other computing systems using computer bus 120 and network connection (not shown) that may be adapted to one or more of a wide variety of networks, including local area networks, storage area networks, wide area networks, the Internet, and the like.

In one aspect of the invention, the encryption algorithm may be supplied encoded on a CD-ROM or a floppy disk (depicted as storage device 133), or alternatively could be read from the network via a network interface connected to the computing system 100. In yet another aspect of the invention, the computing system 100 can load the software from other computer readable media such as magnetic tape, a ROM or integrated circuit or a magneto-optical disk.

Alternatively, the encryption algorithm is installed onto the storage device 133 using an installation program and is executed using the CPU 121.

In another aspect of the present invention, the encryption algorithm is implemented in hardware, for example, in an application specific integrated circuit (ASIC) or any other hardware mechanism.

It is noteworthy that the present invention is not limited to the FIG. 1 architecture. For example, notebook or laptop computers, set-top boxes or any other system capable of running computer-executable process steps, as described below, may be used to implement the various aspects of the present invention.

The present invention can be better understood by first describing the various steps involved in a data encryption process, namely the AES process.

AES Method of Encryption:

AES uses block cipher method for encryption involving whole-byte operations. (Block cipher method is an encryption scheme in which the data is divided into fixed-size blocks (often 64 bits), each of which is encrypted independent of the others). Any one of 128, 192 or 256 bits of key size can be chosen. For simplicity purpose, the data block size is 128 bits and the size of the expanded key corresponding to the data block is presumed to be 176 bytes.

AES encryption cycle involves regular encryption rounds and a final short encryption round. The regular encryption round consists of four basic steps—Byte Substitution (BSB), Shift Row (SR), Mix Column (MC) and Add Round Key (ARK). The short encryption round consists of the Byte Substitution step, Shift Row step and Add Round Key step. A typical AES encryption cycle is illustrated in FIG. 2.

Figure 2:
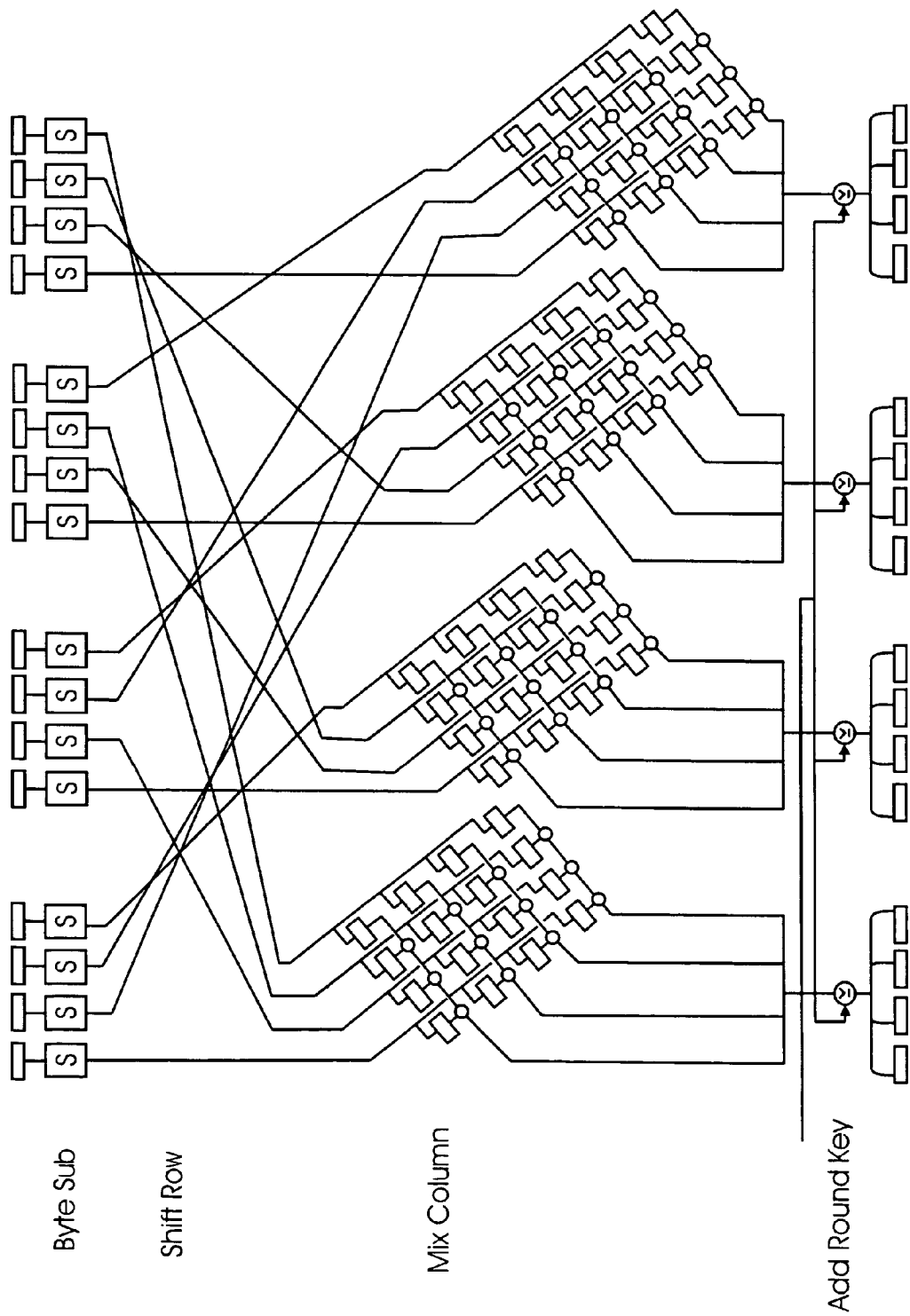
FIG. 2 shows the various steps of involved in encryption based on the Advanced Encryption Standard (AES).

Referring to FIG. 2, in the Byte Substitution step, each byte of the data block is replaced by a substitute value from a Substitution box (S-box). The S-box, according to AES, is calculated by using finite field arithmetic or Galois Field. The S-box is generated by determining the multiplicative inverse for a given number using finite field arithmetic and performing mathematical operation on the result, said multiplicative inverse further transformed using an affine transformation.

The reciprocal (multiplicative inverse) of each byte of the data block in the same Galois Field is determined and each byte of the data block is replaced with this reciprocal, (except for 0, which is defined as its own reciprocal,) is replaced by it. The result is then transformed using a mathematical operation. The mathematical operation that is performed is a bit wise modulo-two matrix multiplication and the hexadecimal 63 is exclusively-OR'ed (XORed) with the result.

In the Shift Row step (SR), the data block is arranged in the form of a rectangle to form a state matrix. The state matrix is shifted using specific reordering sequence for each row and the same reordering sequence is used in every round of encryption.

In the Mix Column (MC) step, matrix multiplication is performed on each column of the state matrix. The following matrix is used in matrix multiplication with the state matrix in every round of encryption:

2 3 1 1
1 2 3 1
1 1 2 3
3 1 1 2

The multiplication is done over Galois Field ($2^8$) (GF ($2^8$)) where the bytes being multiplied are treated as polynomials. If the result is more than 8 bits, the extra bits are cancelled out by exclusively-OR'ing (XORing) the binary 9-bit string equivalent of the decimal number 283. This 9-bit string stands for the $8^{th}$ order irreducible generating polynomial (283 in decimal) of the particular version of GF ($2^8$) used. Under AES, the generating polynomial is same for every round of encryption.

In the Add Round Key (ARK) step, a single expanded key, derived using a Key Schedule, is used on each byte of data. This step XORs the next unused 16 byte (for a 128 bit data block) chunk of the expanded key for the current round. The same expanded key is used in every round of encryption.

A typical AES encryption cycle uses the following sequence of steps for an input data size of 128 bits and key size of 176 bytes:

The regular encryption round includes:
BSB
SR
MC
ARK

A total of 9 encryption rounds for 128 bit data block and key size is followed by a short encryption round that involves the following steps:
BSB
SR
ARK For a 192 bit input data, the expanded encryption key size is 208 bytes. The typical AES encryption cycle for a 192 bit input data would include 11 regular encryption rounds followed by a short encryption round for a total of 12 encryption rounds. Similarly, for a 256 bit input data, the expanded key size is 240 bytes and the typical AES encryption cycle would include 13 regular encryption rounds followed by a short encryption round for a total of 14 encryption rounds.

Figure 3:
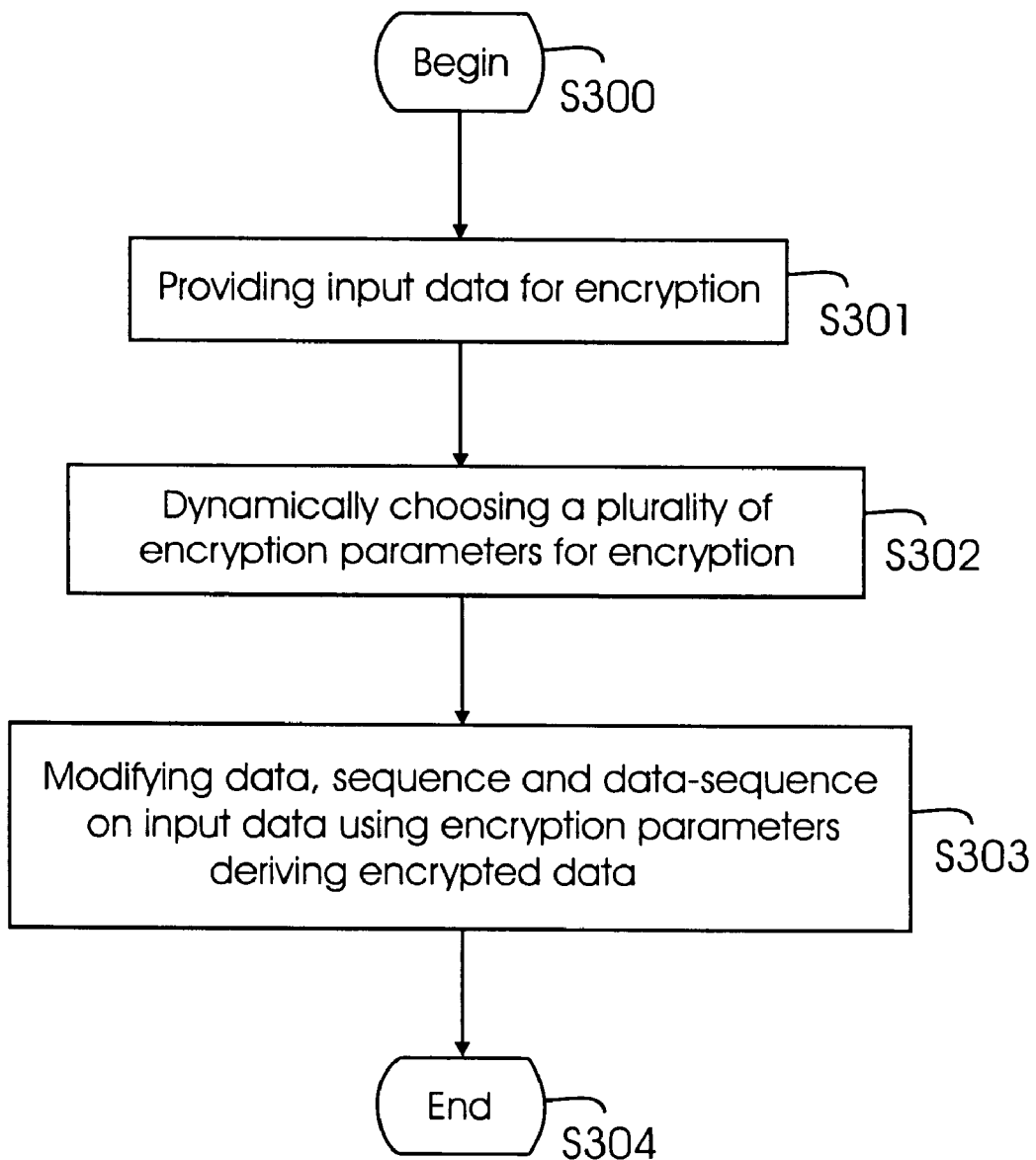
FIG. 3 shows an encryption process flow diagram, according to one aspect of the present invention.

Process Flow:

FIG. 3 depicts the computer executable process steps involved in the encryption process, according to one aspect of the present invention. The process begins with step S300. In step S301, input data is provided on the computing system 100.

Data may be input by a) providing a user interface such as a keyboard and monitor for users to enter the input data to be encrypted, receiving the keyed input data from the user, storing the input data in the storage device 133 and making the input data available for encryption, or b) providing an interface to receive input data from another computing system such as a network interface 122, receiving the input data through the network interface 122, storing the input data in the storage device 133 and making it available for encryption.

The input data is received in blocks and the block size may be of any size, for example, 128 bits, 192 bits or 256 bits. The size of the input data determines the size of the expanded key used in the encryption process. For 128 bit input data, a 176 byte long expanded key is used, for 192 bit input data, a 208 byte long expanded key is used and for 256 bit input data, a 240 byte long expanded key is used. To illustrate the various steps in the process a 128-bit data block will be used. It is noteworthy that the present invention is not limited to any particular data block size.

Each block of input data is divided into a plurality of sub-blocks (may also be referred to as sub-data). Each sub-data could be one byte long with each byte made up of 8 bits of data. At the beginning of the encryption cycle, the input data is arranged into a state matrix where each field of the state matrix is a sub-data or byte. For the input data of 128 bit data block, the data block is divided into 16 bytes. These bytes, sequentially numbered 1 through 16, may be arranged in a matrix as follows:

$$\begin{matrix} 1 & 5 & 9 & 13 \\ 2 & 6 & 10 & 14 \\ 3 & 7 & 11 & 15 \\ 4 & 8 & 12 & 16 \end{matrix}$$

In Step S302, a user can dynamically choose from a plurality of encryption parameters. The term dynamically as used herein means that a user can select encryption parameters from various options, instead of using the same parameters as specified by AES. One or more encryption parameters are presented during various stages of encryption. The process allows one to choose one or more encryption parameters during each and every step of the encryption cycle. Presenting the encryption parameters, in one embodiment of the invention, could be by identifying a table of encryption parameters (not shown) stored in the storage device 133 and displaying it on the output device such as monitor.

In step S302, one or more rounds of data modification (described below with respect to FIG. 4), sequence modification (described below with respect to FIG. 5), and data-sequence modification (described below with respect to FIG. 6) are performed.

Figure 4:
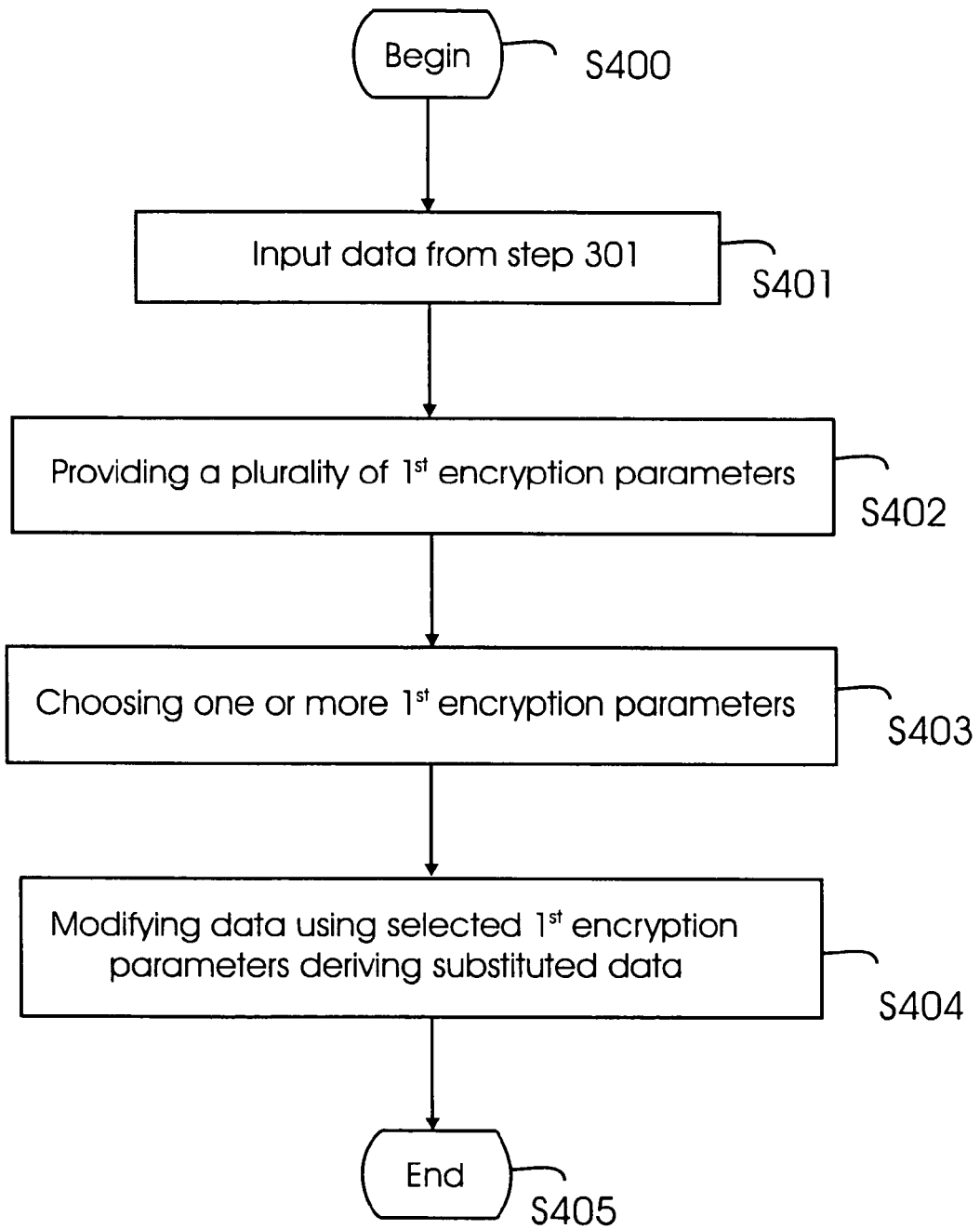
FIG. 4 shows a process flow diagram of the steps involved in data modification referenced in step 302 of FIG. 3.

Using byte-by-byte substitution performs the data modification step. Turning in detail to FIG. 4, in step S402, the process provides a plurality of $1^{st}$ encryption parameters to choose for the data modification step. The $1^{st}$ encryption parameter is a matrix with rows and columns made up of collection of permutation of a given number. This matrix is also called the Substitution-box, or simply, the S-box, as defined above. In one aspect, an S-Box is chosen from plural S-Box options (unlike AES where the same S-Box is used). Any permutation of the numbers $\{0, 1, 2 \ldots 255\}$ can be used as an S-box. Each of the S-boxes has a corresponding inverse S-box for the decryption of the encrypted data.

In step S403, the process allows one or more of the S-boxes to be chosen for the actual byte substitution. In one embodiment of the invention, different S-boxes are chosen for substituting each byte of the input data in each round of the encryption cycle. For example: if there are 10 rounds of encryption in the entire encryption cycle for the 128 bit input data, each of the 16 bytes of data (each 8 bits long) are substituted with bytes from different S-boxes, in each encryption round for 10 rounds. Therefore, a total of 160 different S-boxes are chosen for the Byte substitution step, instead of the same S-Box under the AES.

In another embodiment of the present invention, one S-box is chosen for substituting bytes of input data in each round of the encryption cycle. For example: If there are 10 rounds of encryption in the encryption cycle and one S-box is chosen for each round of the encryption cycle then a total of 10 S-boxes are chosen.

In step S404, input data is substituted with the chosen bytes from one or more S-boxes to generate the substituted data. To accomplish this, the process identifies each byte of the input data to be substituted, locates the S-box for the particular input data byte substitution, identifies the actual byte of the S-box that is substituting the input data byte and substitutes the identified input data byte with the identified S-box byte generating the substituted data.

Every S-box that is presented and chosen in the Byte Substitution step has a corresponding inverse S-box that is used for decrypting the substituted data to arrive at the input data. The process ends in step S405 after the substituted data is generated.

Figure 5:
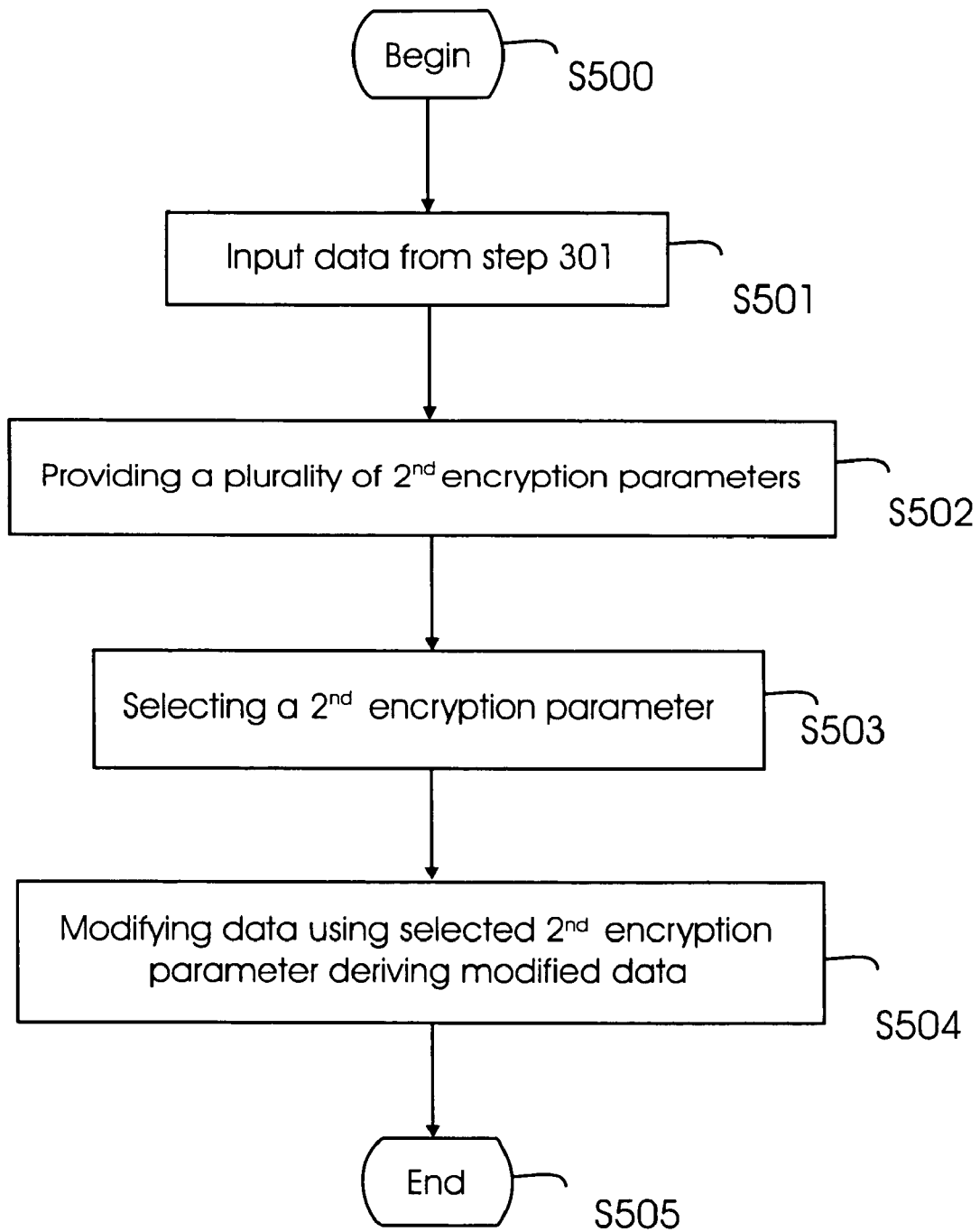
FIG. 5 shows a process flow diagram of the steps involved in sequence modification referenced in step 302 of FIG. 3.

The step of sequence modification (Shift Row step) as referenced in step S303 of is now explained in greater detail with respect to FIG. 5. The input data or the substituted data from the BSB step in the form of a state matrix is used. Data in each row of the state matrix is shifted during this step.

The process begins in step S500. In step S501, the input data or the modified data in the form of state matrix is used in the sequence modification. In step S502, a plurality of $2^{nd}$ encryption parameters is presented. The $2^{nd}$ encryption parameters are permutation functions that allow reordering of the state matrix. Each of the permutation function presented has a corresponding inverse permutation function that is used in reordering the modified data back to the original data before the sequence modification step. This inverse permutation function is used in decrypting the encrypted data.

The permutation functions provide sequences modification instructions to be followed for reordering each row of input data during each round of encryption. Unlike the AES standard, each round of encryption can have different permutation function that would provide reordering sequence instructions for each and every row of the state matrix.

In step S503, a permutation function for the particular round is chosen from a plurality of permutation functions ($2^{nd}$ encryption parameters). In step S504, each row of the state matrix is reordered in accordance with the sequence modification instructions presented in the permutation function. The process step concludes in S505 after the modified data is generated.

Figure 6:
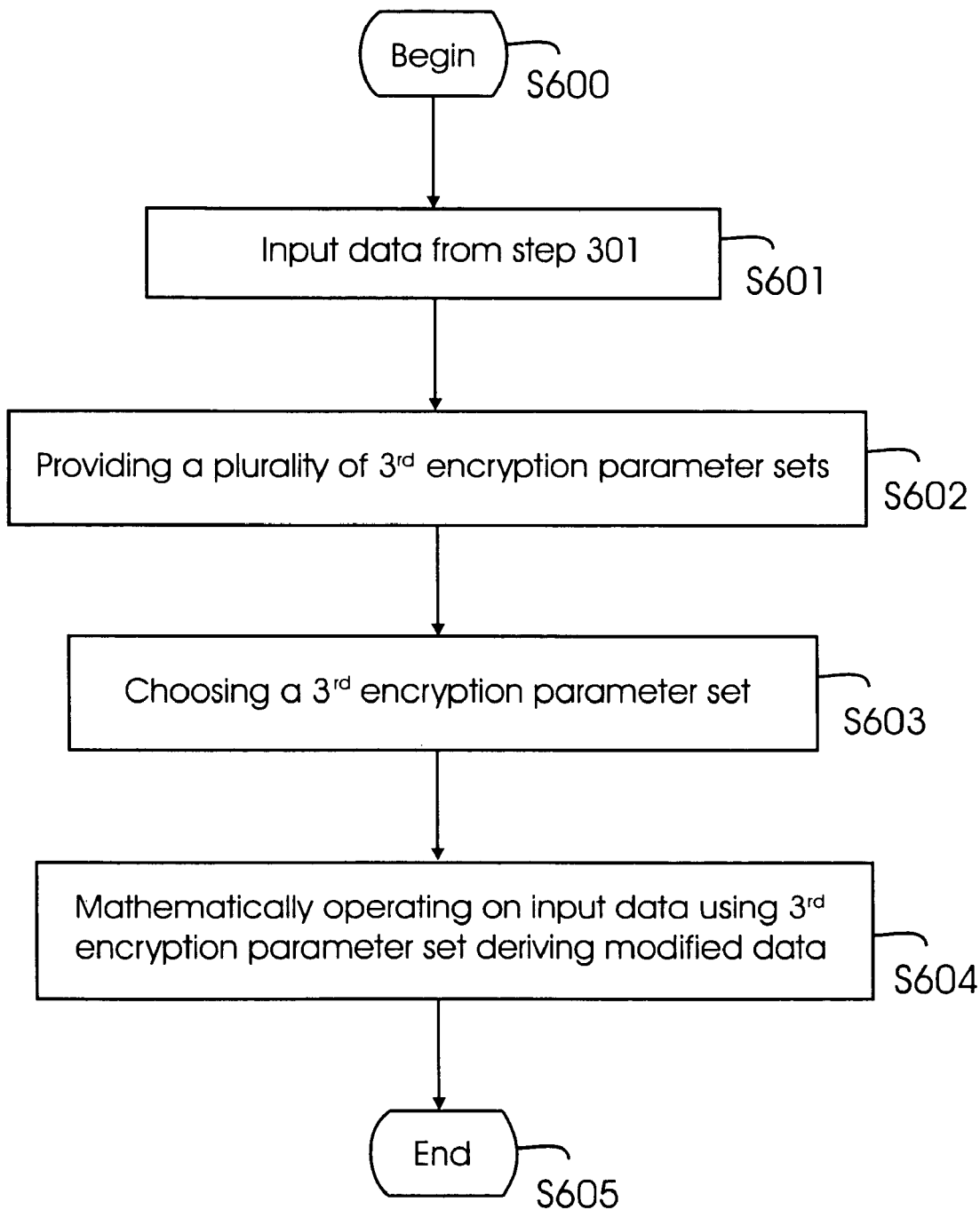
FIG. 6 shows a process flow diagram of the steps involved in data-sequence modification referenced in step 302 of FIG. 3.

The step of data-sequence modification as referenced in step S303 (FIG. 3) is now described in greater detail with respect to FIG. 6. The state matrix from the BSB or the SR step or the input data arranged in a state matrix is used in this Mix Column step. In step S602, a plurality of $3^{rd}$ encryption parameters is presented. The $3^{rd}$ encryption parameters that are used in this step include invertible matrices and irreducible polynomials. For example: any of the thirty $8^{th}$ order irreducible polynomials can be used as one of the $3^{rd}$ encryption parameters for this step. Similarly, any invertible square matrix having the same number of rows and columns as the number of rows in the input data block can be used. Each of the chosen matrices presented has a corresponding inverse matrix that is used in decrypting the modified data back to the original data before the data-sequence modification step. It should be noted that if a non-invertible matrix for the encryption process is used, then there will be no corresponding decryption process. The present invention is not limited to being invertible as there are some cryptographic applications for which an invertible encryption algorithm is not required.

In step S603, one of the plurality of generating polynomials and any one of invertible matrix is chosen for the data-sequence modification. In step S604, the $1^{st}$ mathematical operation is performed over the state matrix using the chosen invertible matrix and generating polynomial. The $1^{st}$ mathematical operation on the state matrix using the chosen invertible matrix would be a matrix multiplication over Galois Field ($2^8$). It is noteworthy that a different invertible matrix and its corresponding Galois constant can be used for each encryption round.

If the result is more than 8 bits, XORing the binary 9-bit string cancels out the extra bits with the chosen generating polynomial generating the modified data. For example: Any $8^{th}$ order irreducible polynomial can be used in canceling out the extra bits.

Figure 7:
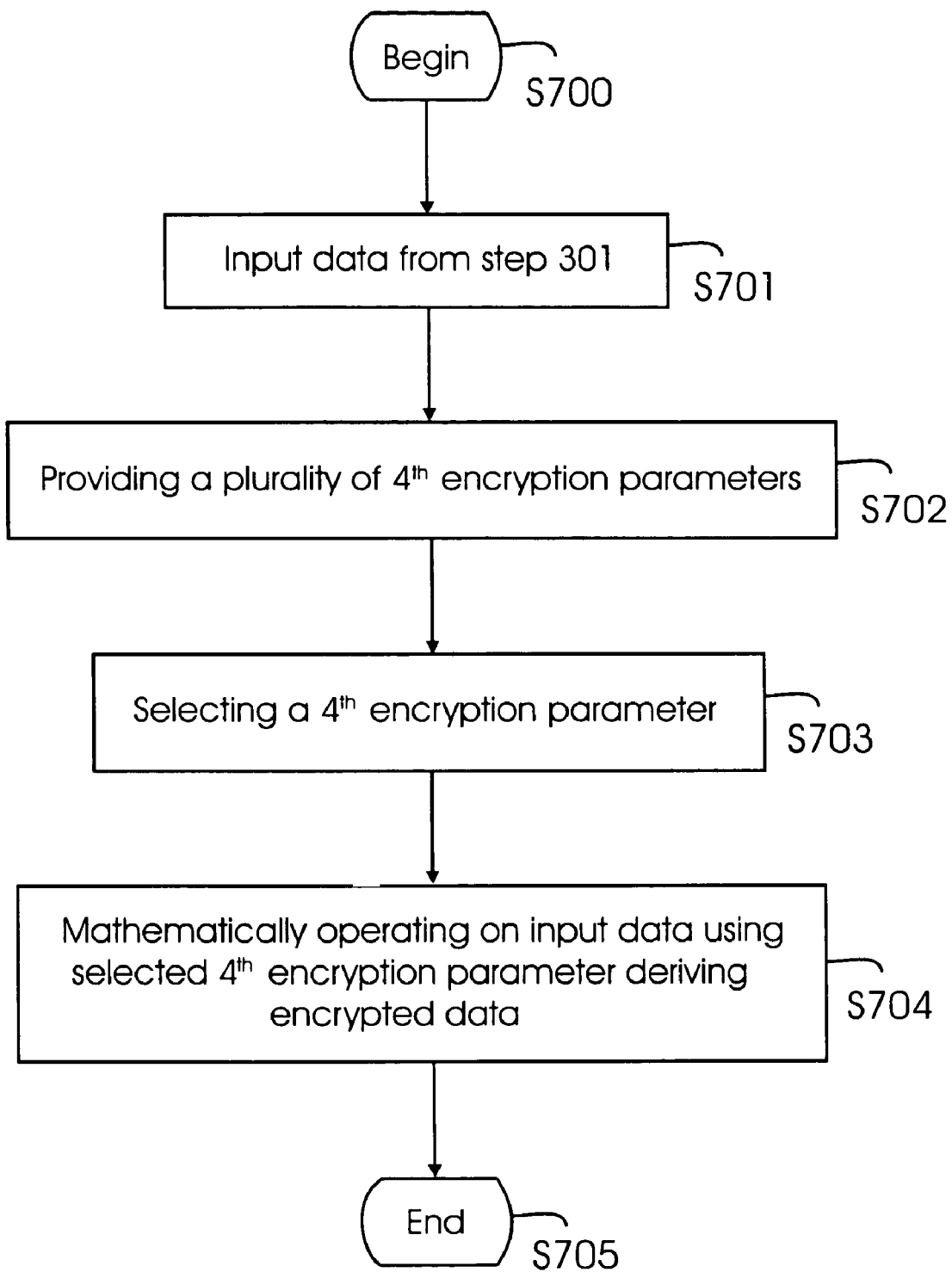
FIG. 7 shows a process flow diagram of the steps involved in the combining step referenced in step 303 of FIG. 3.

The step of modifying data with selectable invertible $4^{th}$ encryption parameter producing encrypted data (Add Round Key or ARK step) as referenced in step S303 of FIG. 3 is now described in greater detail with respect to FIG. 7. The modified data from any one of BSB step, SR step or MC step or the input data arranged in a rectangle matrix is combined with the chosen $4^{th}$ encryption parameter using a $2^{nd}$ mathematical operation to produce the encrypted key.

Referring to FIG. 7, in step S702, the $4^{th}$ encryption parameter is provided. The $4^{th}$ encryption parameter is an expanded key that is generated using a Key Schedule. The size of the expanded key is based on the size of the input data and key choice. The process of providing the expanded key is accomplished by: a) a request for an expanded key is made, a table of expanded key stored in the storage device 133 is presented and the specific expanded key to be used in enciphering the input data is identified and made available, or b) a request is made for an expanded key, a random expanded key sequence is entered into the computing system 100 using input/output device such as a keyboard, and the random expanded key sequence is accepted and made available to the encryption algorithm, or c) a request is made for an expanded key and a random expanded key of size corresponding to the size of the input data is generated by the process and made available to the process.

A table of expanded key values is stored in the storage device using any one of the following methods: a) The expanded key is generated using the AES key schedule that has been described earlier under AES method and stored in the table; or b) it is generated by a user and accepted into the computing system using one of the user interface and stored in the table; or c) it is generated by any other means on the same computing system or a second computing system and stored in the table on the first computing system.

For every expanded key stored in the storage device 133, that same key is used during decryption of the encrypted data, since every expanded key is its own inverse.

In step S703, the desired expanded key is chosen from the table of expanded keys presented or is accepted from the input/output device. In step S704, the resulting state matrix from BSB step or the SR step or the MC step, is XORed with the next unused 16-byte chunk of the expanded key for the current round. The process concludes the ARK step with step S705.

The ARK, BSB, SR and MC steps are repeated as regular rounds based on desirable amount of security needed along with the concluding short encryption round with the BSB step, SR step and ARK step. In one embodiment of the invention, the process runs specific number of regular rounds of encryption followed by short encryption round. For example: The AES encryption cycle runs 9 rounds of regular encryption rounds followed by short encryption round for a 128 bit input data.

However, the encryption cycle does not have to run specific number of rounds.

In one embodiment of the invention, the process runs an arbitrary number of regular encryption rounds followed optionally by a short encryption round. Due to the variability of the encryption parameters that go into the encryption round, a specific number of rounds to maintain a safe and secure encryption are not needed. The number of rounds of encryption can also be varied as long as the process can be reversed for decryption.

Also, the regular encryption round does not require that the BSB step has to be followed by SR step, MC step and ARK step. The sequence of steps used in each round can be varied as long as the sequence and frequency can be reversed using the corresponding encryption parameters for the decryption process.

A sample demonstration program developed in MatLab showing the generalized function is included. MatLab is a data-manipulation software package that allows data to be analyzed and visualized using existing functions and user-designed programs To run this program from a MatLab command prompt, simply type: "aes_demo"

The function generates the following:

A random expanded key

A set of 10 random matrices for performing the Shift Row function

A random selection of 9 generating polynomials for the Mix Columns function

A set of 9 random (but invertible) matrices for the Mix Column function

A set of 160 random S-boxes used for the encryption

A set of 16 random bytes of Plaintext.

This function performs the encryption of the plain text (using all of the above encryption parameters passed to the encryption function). It then decrypts the resulting cipher text and shows that it matches the original plain text.

```
% File: aes_demo.m
% diary('aes_out.txt');

% Random Expanded Key
key = rand_bytes([4 4 11]);

%disp('Expanded Key:');
%t2 = [];
%for i=1:11;
%   t1 = key(:,:,i)';
%   t2 = [t2,t1(:)'];
%end;
%dh(t2);

%disp('Hit any key when you"re bored.');
%pause;nl;nl;

% Make the matrix of values used in the shift rows function
% for encrypting
left_mat = zeros(4,4,10);
for i = 1:10;
    left_mat(:,:,i) = [shuffle(1:4);shuffle(1:4);shuffle(1:4);shuffle(1:4)];
end;

% Make the array of polynomials used for encrypting and decrypting
% poly = repmat(poly,1,9); % Use 11B(hex) = 283 for all 9 for AES prime_polys = [283 285 299 301 313 319 333 351 355 357 361 369 375 379 391,...
    395 397 415 419 425 433 445 451 463 471 477 487 499 501 505];

poly = prime_polys(floor(30*rand(1,9))+1);

% Matrix and its inverse for the mix columns function
% Generate a random set of polynomial matrices poly_mat = rand_bytes([4,4,9]);

% Need to make sure that they're all invertable. If not, patch an
% invertable one in.

for i = 1:9;
    temp = mat_inv(poly_mat(:,:,i),poly(i));
    while ~isfinite(temp(1,1));
        poly_mat(:,:,i) = rand_bytes([4,4]);
        temp = mat_inv(poly_mat(:,:,i),poly(i));
    end;
end;
```

% Plug in random s-boxes and see if it works...

```
s_box = zeros(256,4,4,10);
for i = 1:4;
  for j = 1:4;
    for k = 1:10;
      s_box(:,i,j,k) = shuffle((0:255)');
    end;
  end;
end;
```

% Define an arbitrary series of 16 plaintext bytes
% in hexadecimal (string) representation
% The following two specific plaintexts are used as examples
% in the AES-Specification (draft)
plaintext_hex = {'00' '11' '22' '33' '44' '55' '66' '77' ...
    '88' '99' 'aa' 'bb' 'cc' 'dd' 'ee' 'ff'};

%plaintext_hex = {'32' '43' 'f6' 'a8' '88' '5a' '30' '8d' ...
%           '31' '31' '98' 'a2' 'e0' '37' '07' '34'};

% Convert plaintext from hexadecimal (string) to decimal representation
% plaintext = hex2dec(plaintext_hex);
plaintext = rand_bytes([16 1]);

% Take the NINE polynomials, the 16 bytes of plaintext, the 176 bytes of
% expanded key, the 160 S-Boxes, the NINE polynomial matrices (for mix columns)
% and the TEN matrices for performing the shift rows, and perform the
% encryption that is a generalization of AES.

| % Name | Size | Bytes | Percent of Total |
|---|---|---|---|
| % key | 4x4x11 | 176 bytes | 0.42% |
| % left_mat | 4x4x10 | 160 bytes | 0.39% |
| % plaintext | 16x1 | 16 bytes | 0.04% |
| % poly | 1x9 | 9 bytes | 0.02% |
| % poly_mat | 4x4x9 | 144 bytes | 0.35% |
| % s_box | 256x4x4x10 | 40960 bytes | 98.78% |
| % | ----- | | |
| % | | 41465 Total bytes | | ciphertext = cipher2(poly, plaintext, key, s_box, poly_mat, left_mat);

% Then, run it backwards
re_plaintext = inv_cipher2(poly, ciphertext, key, s_box, poly_mat, left_mat);

```
%dh(plaintext);
%dh(re_plaintext);

if any(plaintext(:)~=re_plaintext(:));
   error('AES Demo Failed');
end;
fprintf('.');
pause(0.01);

%diary('off');
```

```
function disp_hex (string, hex_array)
%DISP_HEX  Display an array in hexadecimal form.
%

% Display the first line
disp([string, sprintf('%2.2X ',hex_array(1,:))]);

% Display the rest of the rows empty_string = repmat(' ',size(string));

for i = 2:length(hex_array(:,1))
   disp([empty_string, sprintf('%2.2X ',hex_array(i,:))]);
end fprintf('\n');

function out = mix_columns(poly,state_in,poly_mat)
%MIX_COLUMNS  Transform each column of the state matrix.
% for col = 1:4;    % For each column
   for row = 1:4   % For each row
      % Small known matrix - explicitly do the dot product.
      out(row,col) = bitxor(...
              bitxor(poly_mult(poly_mat(row,1),state_in(1,col),poly),...
                 poly_mult(poly_mat(row,2),state_in(2,col),poly)),...
              bitxor(poly_mult(poly_mat(row,3),state_in(3,col),poly),...
                 poly_mult(poly_mat(row,4),state_in(4,col),poly)));
   end
end function out = rand_bytes(dims);

out = floor(256*rand(dims));
```

```
function ciphertext = cipher2 (mod_poly,plaintext, w, s_box, poly_mat, left_mat, vargin)
%CIPHER  Convert 16 bytes of plaintext to 16 bytes of ciphertext.
% verbose = (nargin > 6);

% Display headline if requested
if verbose
   disp (' ')
   disp ('**************************************************')
   disp ('*            C I P H E R             *')
   disp ('**************************************************')
   disp (' ')
end % Copy the 16 elements of the input vector
% column-wise into the 4 x 4 state matrix
state = reshape (plaintext, 4, 4);

% Display intermediate result if requested
if verbose
   disp_hex ('Initial state :          ', state)
end % Copy the first 4 rows (4 x 4 elements) of the expanded key
% into the current round key.
% Transpose to make this column-wise
round_key = w(:,:,1)';

% Display intermediate result if requested
if verbose
   disp_hex ('Initial round key :        ', round_key)
end % Add (xor) the current round key (matrix) to the state (matrix)
state = bitxor (state, round_key);

% Loop over 9 rounds
for i_round = 1 : 9

% Display intermediate result if requested
   if verbose
      disp_hex (['State at start of round ', num2str(i_round),' :     '], state)
   end for i = 1:4;
```

```
    for j = 1:4;
      state(i,j) = s_box(state(i,j)+1,i,j,i_round);
    end;
  end;

% Display intermediate result if requested
  if verbose
    disp_hex ('After sub_bytes :         ', state)
  end % Cyclically shift the last three rows of the state matrix
  %state = shift_rows (state);
  state = shift_rows2(state,left_mat(:,:,i_round));

if verbose
    disp_hex ('After shift_rows :        ', state)
  end

% Transform the columns of the state matrix via a four-term polynomial
  state = mix_columns (mod_poly(i_round), state, poly_mat(:,:,i_round));

if verbose
    disp_hex ('After mix_columns :       ', state)
  end

% Extract the current round key (4 x 4 matrix) from the expanded key
  round_key = w(:,:,i_round+1)';

if verbose
    disp_hex ('Round key :               ', round_key)
  end state = bitxor (state, round_key);

end;

% Display intermediate result if requested
if verbose
  disp_hex ('State at start of final round : ', state)
end % Substitute all 16 elements of the state matrix
% by shoving them through the S-box
for i = 1:4;
  for j = 1:4;
    state(i,j) = s_box(state(i,j)+1,i,j,10);
```

```
    end;
end;

% Display intermediate result if requested
if verbose
    disp_hex ('After sub_bytes :          ', state)
end % Cyclically shift the last three rows of the state matrix
state = shift_rows2(state,left_mat(:,:,10));

% Display intermediate result if requested
if verbose
    disp_hex ('After shift_rows :         ', state)
end % Extract the last round key (4 x 4 matrix) from the expanded key
round_key = w(:,:,11)';

% Display intermediate result if requested
if verbose
    disp_hex ('Round key :                ', round_key)
end % Add (xor) the current round key (matrix) to the state (matrix)
state = bitxor (state, round_key);

% Display intermediate result if requested
if verbose
    disp_hex ('Final state :              ', state)
end % reshape the 4 x 4 state matrix into a 16 element row vector
ciphertext = reshape (state, 1, 16);

function plaintext = inv_cipher2 (mod_pol, ciphertext, key, s_box, poly_mat, left_mat, vargin)
%INV_CIPHER  Convert 16 bytes of ciphertext to 16 bytes of plaintext.
% verbose = (nargin > 6);

% Display headline if requested
if verbose
    disp (' ')
```

```
    disp ('**********************************************')
    disp ('*      I N V E R S E   C I P H E R       *')
    disp ('**********************************************')
    disp (' ')
end % For test purposes, generate the appropriate inverse from the s_box table:
inv_s_box = zeros(size(s_box));
for i = 1:4;
  for j = 1:4;
    for k = 1:10;
      inv_s_box(s_box(:,i,j,k)+1,i,j,k) = 0:255;
    end;
  end;
end;

inv_poly_mat = zeros(size(poly_mat));

% Generate the inverse polynomial matrices. If any of the polynomial matrices
% are singular, replace them while we're at it.

for i = 1:9;
  inv_poly_mat(:,:,i) = mat_inv(poly_mat(:,:,i),mod_pol(i));
  while ~isfinite(inv_poly_mat(1,1,i));
    poly_mat(:,:,i) = rand_bytes([4,4]);
    inv_poly_mat(:,:,i) = mat_inv(poly_mat(:,:,i),mod_pol(i));
  end;
end;

% right_mat has to be the inverse of left_mat, so construct it.
temp = zeros(1,4);
right_mat = zeros(size(left_mat));
for i = 1:10;
  for r = 1:4;
    temp(left_mat(r,:,i))=1:4;
    right_mat(r,:,i) = temp;
  end;
end;

% Copy the 16 elements of the input vector column-wise into the 4 x 4 state matrix
state = reshape (ciphertext, 4, 4);

% Display intermediate result if requested
if verbose
  disp_hex ('Initial state :              ', state)
``` end

% Copy the last 4 rows (4 x 4 elements) of the expanded key
% into the current round key.
% Transpose to make this column-wise
round_key = key(:,:,11)';

% Display intermediate result if requested
if verbose
    disp_hex ('Initial round key :         ', round_key)
end % Add (xor) the current round key (matrix) to the state (matrix)
state = bitxor (state, round_key);

% Loop over 9 rounds backwards
for i_round = 9 : -1 : 1

% Display intermediate result if requested
    if verbose
        disp_hex (['State at start of round ', num2str(i_round),' :       '], state)
    end % Cyclically shift the last three rows of the state matrix
    state = shift_rows2(state,right_mat(:,:,i_round+1));

% Display intermediate result if requested
    if verbose
        disp_hex ('After inv_shift_rows :      ', state)
    end % Substitute all 16 elements of the state matrix
    % by shoving them through the S-box
    for i = 1:4;
        for j = 1:4;
            state(i,j) = inv_s_box(state(i,j)+1,i,j,i_round+1);
        end;
    end;

% Display intermediate result if requested
    if verbose
        disp_hex ('After inv_sub_bytes :       ', state)
    end % Extract the current round key (4 x 4 matrix) from the expanded key
    round_key = key(:,:,i_round+1)';

```
% Display intermediate result if requested
if verbose
   disp_hex ('Round key :              ', round_key)
end % Add (XOR) the current round key (matrix) to the state (matrix)
state = bitxor (state, round_key);

% Display intermediate result if requested
if verbose
   disp_hex ('After add_round_key :        ', state)
end % Transform the columns of the state matrix via a four-term polynomial.
% Use the same function (mix_columns) as in cipher,
% but with the inverse polynomial matrix
state = mix_columns (mod_pol(i_round), state, inv_poly_mat(:,:,i_round));

end

% Display intermediate result if requested
if verbose
   disp_hex ('State at start of final round :  ', state)
end % Cyclically shift the last three rows of the state matrix
%state = inv_shift_rows (state);
state = shift_rows2(state,right_mat(:,:,1));

% Display intermediate result if requested
if verbose
   disp_hex ('After inv_shift_rows :       ', state)
end % Substitute all 16 elements of the state matrix
% by shoving them through the inverse S-box
for i = 1:4;
   for j = 1:4;
      state(i,j) = inv_s_box(state(i,j)+1,i,j,1);
   end;
end;

% Display intermediate result if requested
```

```
if verbose
   disp_hex ('After inv_sub_bytes :      ', state)
end

% Extract the "first" (final) round key (4 x 4 matrix) from the expanded key
round_key = key(:,:,1)';

% Display intermediate result if requested
if verbose
   disp_hex ('Round key :               ', round_key)
end % Add (xor) the current round key (matrix) to the state (matrix)
state = bitxor (state, round_key);

% Display intermediate result if requested
if verbose
   disp_hex ('Final state :             ', state)
end % reshape the 4 x 4 state matrix into a 16 element row vector
plaintext = state(:)';

function out = mult_inv(in,poly);

% For input IN and polynomial POLY, this returns OUT such that
% (IN x OUT) Mod POLY = 1
%
% It caches results so that it runs slower in the beginning,
% but speeds up and ultimately becomes table driven.

persistent inv_vals poly_list;

if isempty(inv_vals);
   inv_vals = zeros(30,256);
   poly_list = zeros(1,30);
end;

ind = find(poly == poly_list);

if isempty(ind);
   temp = find(0 == poly_list);
   ind = temp(1);
```

```
poly_list(ind) = poly;

for i=0:255;
  for j=0:255;
    if poly_mult(i,j,poly)==1;
      inv_vals(ind,i+1)=j;
      inv_vals(ind,j+1)=i;
      break;
    end;
  end;
end;
end;

out = inv_vals(ind,in);
```

```
function state_out = shift_rows2 (state_in,rot_mat)
%SHIFT_ROWS Cyclically shift the rows of the state matrix based in the
% input rotation matrix
% temp = state_in';

temp = temp(:);

state_out = temp((0:4:12)'*ones(1,4)+rot_mat);

function dh(in);

% Display the matrix in hex, putting it out in row order in = in';   % Change into column order for fprintf fprintf([repmat([repmat('%2.2X ',1,4), '  '],1,3),repmat('%2.2X ',1,3),'%2.2X\n'],in);

fprintf('\n');

%fprintf('%2.2X %2.2X %2.2X %2.2X  %2.2X %2.2X %2.2X %2.2X  %2.2X %2.2X %2.2X %2.2X  %2.2X %2.2X %2.2X %2.2X\n',in);
```

```
function out = mat_inv(in,poly);

full_rank = 1;   % Presume full rank until we find otherwise

[r,c] = size(in);

left = eye(r);

for col = 1:c;   %For each column
  next_row = col+1;
  while (in(col,col)==0) & full_rank;

if next_row > c;    % If we ran out of rows
      full_rank = 0;    % Flag the error
      warning('Matrix is singular.');
       break;           % Exit the while loop
    end;

%We got here = need to swap rows, and there are rows left to swap temp1 = in(col,:);
    in(col,:) = in(next_row,:);
    in(next_row,:) = temp1;

temp1 = left(col,:);
    left(col,:) = left(next_row,:);
    left(next_row,:) = temp1;

next_row = next_row+1;
  end;

if full_rank;
    % Now, subtract the row from every other row:
    for temp_row = 1:c;
      if temp_row ~= col;
        scale = loc_div(in(temp_row,col),in(col,col),poly);
        in(temp_row,:) = loc_minus(in(temp_row,:),loc_mult(scale,in(col,:),poly),poly);
        left(temp_row,:) =
loc_minus(left(temp_row,:),loc_mult(scale,left(col,:),poly),poly);
      end;
    end;
  end;
end;

if full_rank
```

```
for i=1:c;
    left(i,:) = loc_div(left(i,:),in(i,i),poly);
end;

out = left;

else
    out = repmat(inf,r,c);
end;

% Following functions are local only to mat_inv function out = loc_mult(a,b,poly);
len = length(b);
out = zeros(size(b));
for i = 1:len;
    out(i) = poly_mult(a,b(i),poly);
end;
return;

function out = loc_minus(a,b,poly);
out = bitxor(a,b);
need_xor = logical(bitget(out,9));
out(need_xor) = bitxor(out(need_xor),poly);
return;

function out = loc_div(a,b,poly);
t1 = mult_inv(b+1,poly);
len = length(a);
out = zeros(size(a));
for i = 1:len;
    out(i) = poly_mult(a(i),t1,poly);
end;
return;
```

% Previous functions are local only to mat_inv

```
function out = poly_mult(a, b, poly);

cache = 1;

if ~cache out = poly_mult_init (a, b, poly);
  return;

else
  persistent table init_flag prime_polys if isempty(init_flag);
    init_flag = 1;

prime_polys = [283 285 299 301 313 319 333 351 355 357 361 369 375 379 391,...
        395 397 415 419 425 433 445 451 463 471 477 487 499 501 505];

table = zeros([256 256 30]);
    disp('initializing poly_mult');
    for i = 0:255;
      disp(i);
      for j = 0:255;
        for poly = 1:30;
          table(i+1,j+1,poly) = poly_mult_init(i, j, prime_polys(poly));
        end;
      end;
    end;
  end;

poly_ind = find(prime_polys == poly);

out = table(a+1,b+1,poly_ind);

return;

end;
```

% Following function is local only to poly_mult function out = poly_mult_init (a, b, poly)

% First part does the polynomial multiplication by PFM out = sum(bitset(0,16-find(bitand(1,filter(bitget(a,8:-1:1),1,...
    [bitget(b,8:-1:1) 0 0 0 0 0 0 0])))));

% Second part reduces it by the polynomial
for i = 16:-1:9
  if bitget (out,i)
    out = bitxor(out, bitshift(poly, i-9));
  end
end % Previous function is local only to poly_mult While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method to encrypt and decrypt data comprising:
providing input data to be encrypted, said input data made up of a plurality of sub-data, each said sub-data comprising a sequence of bits of data;
dynamically selecting a plurality of selected encryption parameters such that a different encryption parameter is selected from a plurality of encryption parameters for each round of encryption, wherein dynamically means that a user chooses one or more encryption parameters in each of a plurality of steps in each round by selecting one or more encryption parameters from various options presented during the plurality of steps in each round of encryption; and
performing one or more rounds of a combination of data modification, sequence modification and data-sequence modification using the plurality of selected encryption parameters deriving encrypted data;
wherein performing data modification comprises performing data modification using a byte-by-byte substitution, performing data modification further comprising arranging said plurality of sub-data into a state matrix, said state matrix comprising said plurality of sub-data ordered in a matrix rectangle; identifying a sub-data from said plurality of sub-data to be modified; identifying one of a plurality of first encryption parameters for the modification, the plurality of first encryption parameters being one of a plurality of substitution-boxes; and
replacing said sub-data from an identified first encryption parameter.

2. The method of claim 1, wherein said input data is 128 bits, 192 bits or 256 bits of data.

3. The method of claim 1, wherein dynamically selecting a plurality of encryption parameters such that a different encryption parameter is selected from the plurality of encryption parameters for each round of encryption further comprises:
presenting the plurality of encryption parameters; and
selecting a first encryption parameter from the plurality of encryption parameters for a first encryption round and selecting a second encryption parameter for a second encryption round different than the first encryption parameter.

4. The method of claim 1, wherein replacing said sub-data from said identified first encryption parameter further comprises:
locating an appropriate substitution byte value in said identified first encryption parameter; and
replacing said sub-data by said substitution byte value in said identified first encryption parameter.

5. The method of claim 1, wherein the one of the plurality of substitution-boxes is a matrix of bytes generated by Galois Field arithmetic.

6. The method of claim 1, wherein performing sequence modification comprises performing sequence modification using shift-row, performing sequence modification further comprising:
arranging said plurality of sub-data into a state matrix, said state matrix comprising said plurality of sub-data ordered in a matrix rectangle;
choosing one of a plurality of second encryption parameters for sequence modification; and
reordering each row in said state matrix based on a chosen second encryption parameter.

7. The method of claim 6, wherein said second encryption parameter is a permutation function, said permutation function providing a sequence of reordering operations on each row of said state matrix, and wherein each round uses a different second encryption parameter.

8. The method of claim 1, wherein performing data-sequence modification comprises performing data-sequence modification using mix column, performing data sequence modification further comprising:
arranging said plurality of sub-data into a state matrix, said state matrix comprising said plurality of sub-data ordered in a matrix rectangle; and
choosing one of a plurality of second encryption parameters for data-sequence modification; and performing a first set of mathematical operations on said state matrix using a chosen second encryption parameter;
wherein said second encryption parameter includes an invertible polynomial matrix and an irreducible polynomial.

9. The method of claim 8, wherein said first set of mathematical operations includes a matrix multiplication using said invertible polynomial matrix and input data in the state matrix.

10. The method of claim 9, wherein said first set of mathematical operations further includes data manipulation of the state matrix by exclusive-or'ing using a chosen generating polynomial.

11. The method of claim 1, wherein performing data modification comprises performing data modification using add round key, performing data modification further comprising:
arranging said plurality of sub-data into a state matrix, said state matrix comprising said plurality of sub-data ordered in a matrix rectangle;
choosing a second encryption parameter; and
combining a chosen second encryption parameter with input data using a mathematical operation producing encrypted data.

12. The method of claim 11, wherein said mathematical operation is by exclusive-or'ing said chosen second encryption parameter with said input data in said state matrix.

13. The method of claim 11, wherein said second encryption parameter is an invertible expanded key, said invertible expanded key produced using a key schedule, size of said invertible expanded key varying in size based on said input data.

14. The method of claim 3, wherein the first encryption parameter is a first substitution box and the second encryption parameter is a second substitution box.

15. The method of claim 3, wherein the first encryption parameter is a first permutation function and the second encryption parameter is a second permutation function.

16. The method of claim 3, wherein the first encryption parameter is selected from a first invertible matrix, a first irreducible polynomial, and a first expanded key and the second encryption parameter is selected from a second invertible matrix, a second irreducible polynomial, and a second expanded key.

17. A system to encrypt and decrypt data, comprising:
one or more processors, one or more computer-readable memories, and one or more computer-readable storage devices;
computer program instructions stored on at least one of the one or more computer-readable storage devices for execution on one of the one or more processors via at least one of the one or more computer-readable memories for receiving input data to be encrypted, said input data made up of a plurality of sub-data, each said sub-data comprising a sequence of bits of data;

computer program instructions stored on at least one of the one or more computer-readable storage devices for execution on one of the one or more processors via at least one of the one or more computer-readable memories for dynamically selecting a plurality of invertible encryption parameters, wherein dynamically means that a user chooses one or more encryption parameters in each step of a plurality of steps in each round by selecting one or more encryption parameters from various options presented during steps in each round of encryption;

computer program instructions stored on at least one of the one or more computer-readable storage devices for execution on one of the one or more processors via at least one of the one or more computer-readable memories for performing one or more rounds of a combination of data modification, sequence modification and data-sequence modification using a plurality of selected invertible encryption parameters deriving encrypted data, wherein performing data modification comprises performing data modification using byte-by-byte substitution, performing data modification further comprising arranging said plurality of sub-data into a state matrix, said state matrix comprising said plurality of sub-data ordered in a matrix rectangle;

computer program instructions stored on at least one of the one or more computer-readable storage devices for execution on one of the one or more processors via at least one of the one or more computer-readable memories for identifying a sub-data from said plurality of sub-data to be modified;

computer program instructions stored on at least one of the one or more computer-readable storage devices for execution on one of the one or more processors via at least one of the one or more computer-readable memories for identifying one of a plurality of first encryption parameters for the modification, the plurality of first encryption parameters being one of a plurality of substitution-boxes;

computer program instructions stored on at least one of the one or more computer-readable storage devices for execution on one of the one or more processors via at least one of the one or more computer-readable memories for replacing said sub-data from an identified first encryption parameter;

computer program instructions stored on at least one of the one or more computer-readable storage devices for execution on one of the one or more processors via at least one of the one or more computer-readable memories for storing a plurality of invertible first parameter keys, a plurality of permutation functions, a plurality of invertible matrices, a plurality of irreducible polynomials, a plurality of invertible expanded keys; and computer program instructions stored on at least one of the one or more computer-readable storage devices for execution on one of the one or more processors via at least one of the one or more computer-readable memories for receiving a selection by the user of at least one of the plurality of invertible first parameter keys, the plurality of permutation functions, the plurality of invertible matrices, the plurality of irreducible polynomials, or the plurality of invertible expanded keys to encrypt input data to form a selected parameter, wherein a different selected parameter is selected by the user for each round of encryption.

18. The system of claim 17, wherein the plurality of invertible first parameter keys, the plurality of permutation functions, the plurality of invertible matrices, the plurality of irreducible polynomials, and the plurality of invertible expanded keys are accessible by the processor via a network connection.

\* \* \* \* \*